United States Patent
Colley (10) Patent No.: US 10,241,670 B2
(45) Date of Patent: Mar. 26, 2019

(54) CHARACTER ENTRY APPARATUS AND ASSOCIATED METHODS

(75) Inventor: Ashley Colley, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 469 days.

(21) Appl. No.: 13/076,883

(22) Filed: Mar. 31, 2011

(65) Prior Publication Data

US 2012/0249425 A1    Oct. 4, 2012

(51) Int. Cl.
| | | |
|---|---|---|
| G06F 3/043 | (2006.01) | |
| G06F 3/023 | (2006.01) | |
| G06F 3/041 | (2006.01) | |
| G06F 3/0354 | (2013.01) | |
| G06K 9/00 | (2006.01) | |
| G06F 3/0488 | (2013.01) | |
| G06F 3/02 | (2006.01) | |
| G06F 3/0489 | (2013.01) | |

(52) U.S. Cl.
CPC ........ *G06F 3/04883* (2013.01); *G06F 3/0227* (2013.01); *G06F 3/0489* (2013.01)

(58) Field of Classification Search
CPC ............. G06F 3/033; G09G 5/00; G06K 9/00
USPC .......... 345/156, 467; 382/186, 187; 715/773
See application file for complete search history.

(56) References Cited

U.S. PATENT DOCUMENTS

| | | | | |
|---|---|---|---|---|
| 7,205,982 B1* | 4/2007 | Kurosawa | ............. | G06F 3/0219 345/168 |
| 7,721,222 B1* | 5/2010 | Shaik | ...................... | G06F 3/018 345/156 |
| 8,077,974 B2* | 12/2011 | Kumar | ................. | G06F 3/03545 345/179 |
| 2003/0197736 A1* | 10/2003 | Murphy | ................ | G06F 3/0236 715/780 |
| 2004/0164951 A1* | 8/2004 | Lun Pun et al. | ............. | 345/156 |
| 2004/0196266 A1* | 10/2004 | Matsuura | .............. | G06F 3/0233 345/169 |
| 2008/0101701 A1* | 5/2008 | Rainisto | ............. | G06K 9/00402 382/187 |
| 2010/0125811 A1* | 5/2010 | Moore | ................ | G06F 3/04817 715/846 |
| 2010/0149190 A1* | 6/2010 | Yan et al. | ..................... | 345/467 |
| 2011/0219302 A1* | 9/2011 | Kondo | .................. | G06F 3/0416 715/702 |
| 2011/0280641 A1* | 11/2011 | Jiang | .................... | G06F 3/0213 400/486 |

\* cited by examiner

*Primary Examiner* — Lin Li
(74) *Attorney, Agent, or Firm* — Alston & Bird LLP (57) ABSTRACT

An apparatus comprising: a processor; and a memory including computer program code, the memory and the computer program code configured to, with the processor, cause the apparatus to perform the following: detect, from a key user interface of an electronic device, key input of a particular key character from a first set of key characters; detect, from a user-scribe delineation user interface of the electronic device, user-scribed delineation input of a particular delineation character from a second set of delineation characters; wherein the first and sets of characters comprise respective mutually exclusive sets of characters, and wherein the apparatus is configured to associate together the particular key character and the particular delineation character for display.

20 Claims, 4 Drawing Sheets

CHARACTER ENTRY APPARATUS AND ASSOCIATED METHODS

TECHNICAL FIELD

The present disclosure relates to the field of user interfaces for character entry, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Electronic devices may enable character input, for example, to write a text message or email. Conventional solutions provide a keyboard arrangement with a number of keys, wherein each key corresponds to a character. Some keyboards permit characters not directly associated with a single key to be accessed using multiple keys, or using multiple presses of the same key.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising:
  a processor; and
  a memory including computer program code,
  the memory and the computer program code configured to, with the processor, cause the apparatus to perform the following:
  detect, from a key user interface of an electronic device, key input of a particular key character from a first set of key characters;
  detect, from a user-scribe delineation user interface of the electronic device, user-scribed delineation input of a particular delineation character from a second set of delineation characters;
  wherein the first and sets of characters comprise respective mutually exclusive sets of characters, and wherein the apparatus is configured to associate together the particular key character and the particular delineation character for display.

A user-scribed delineation may be a two dimensional shape which has been scribed/drawn/handwritten by the user.

A character may comprise a standardised symbol (for example a letter or number in a given font). A character may be stored in a memory.

A user-scribed delineation may comprise a two-dimensional array of pixels. The user-scribed delineation input may comprise a list of pixel positions, the corresponding pixel size and/or corresponding colour.

A user-scribed delineation is a delineation which has been scribed/hand-written/hand-drawn by a user. A user-scribed delineation may be a delineation which has a shape/form corresponding to the movement and/or position of a scriber under the control of a user when the user is scribing/writing/drawing the delineation. A scribed delineation may be created by a user moving/positioning a scriber, the motion and/or position of which is recognised by the user interface and wherein the resulting delineation corresponds to the motion/position of the scriber. The scriber may, for example, comprise a stylus, a wand, a finger, a hand or a mouse.

A character may comprise a combination of one or more of a word, a letter character (e.g. from the Roman, Greek, Arabic or Cyrillic alphabets), a graphic character (e.g. a sinograph, Japanese kana or Korean delineation), a drawing, a phrase, a syllable, a diacritical mark, an embellishment mark, an emoticon, a punctuation mark and a sentence.

For example, the first and second sets may be configured such that the first set of key characters comprises alphabetic characters; and the second set of delineation characters comprises numeric characters. The first and second set may be configured such that the first set of key characters comprises alphanumeric characters; and the second set of delineation characters comprises emoticons. The first and second set may be configured such that the first set of key characters comprises alphanumeric characters; and the second set of delineation characters comprises punctuation marks. The first and second set may be configured such that the first set of key characters comprises logograph characters; and the second set of delineation characters comprises alphanumeric characters.

The first set of key characters and the second set of delineation characters may be mutually exclusive such that the second set delineation characters are characters which are not immediately available for entry via the keyboard/key user interface. The keys immediately available for entry via the keyboard may be the characters which are indicated by the by the indicia of the keys of the keyboard/key user interface at the time of input.

Key input may comprise a combination of one or more of:
  single-press key input corresponding to a single press of a single key;
  multiple-press key input corresponding to multiple presses of a single key; and
  multiple-key key input corresponding to single presses of multiple keys.

For example, if key input comprises only single-press key input corresponding to single presses of a single key, the apparatus may be configured to input a delineation character in response to delineation input and single presses of multiple keys (e.g. 'Alt-Gr'+a corresponding to the character á) and/or multiple presses of a single key (other inputs provided by the keys which are not key input). Likewise, if key input comprises only single-press and multiple-press key input, the apparatus may be configured to input a delineation character in response to delineation input and single presses of multiple keys (e.g. 'Alt-Gr'+a corresponding to the character á).

The user interface may comprise a display. The display may be configured to display a virtual keyboard, the virtual keyboard comprising a said key of the electronic device, wherein the virtual keyboard is configured to produce delineation input in response to user interaction.

The apparatus may comprise a user-scribe delineation user interface, wherein the user-scribe delineation user interface is configured to detect motion/position of the user to generate user-scribed delineations. In other words, the user-scribe delineation user interface may be configured to detect the motion of the user whilst the user is interacting with the user interface. For example, the user-scribe delineation user interface may comprise a touchpad which is configured to detect the motion/position of the users hand when the user is in contact with the touch pad. Alternatively/additionally, the user-scribe delineation user interface may comprise a mouse. The mouse may be configured to detect motion of itself with respect to the surface it is resting on (e.g. by a rollerball or LED and sensor). As the motion of the mouse corresponds to the motion of the users hand when controlling the mouse, the mouse may be considered to be detecting motion of the user.

As the user-scribe delineation user interface may be configured to use the motion of the user to create an individual user-scribed delineation the solution described herein may allow more intuitive entering of a character.

The user-scribe delineation user interface may comprise, for example, a wand (e.g. from Nintendo Wii™), a touchpad, a touch-screen, a mouse, a motion detector, a position detector and/or an accelerometer.

The user interface may comprise a display, the display comprising:
- a key user interface region representing a virtual keyboard, the virtual keyboard comprising a said key of the electronic device; and
- a separate user-scribe delineation user interface region configured to produce delineation input in response to user interaction.

The apparatus may be configured to:
detect, from a user-scribe delineation user interface of the electronic device, user-scribed delineation input of a particular delineation function from a function set of delineation functions. The delineation function may comprise, for example, capitalise, embolden and/or italicise.

The apparatus may be configured to:
form a composite character comprising a said key input character and a said delineation input character which are associated with consecutively received key input and delineation input;
enable input of the composite character into a textual message.

The apparatus may be configured to:
denote an input character as being either a key input character or a delineation input character, based on at least one of type of character, user selection and frequency of use.

The association of a delineation input character with a said received delineation input may be configured to be performed using at least one of intelligent character recognition, intelligent word recognition, gesture recognition and handwriting recognition.

Each delineation character may have a corresponding set of delineation input characteristics, in order to associate the delineation input with the corresponding delineation character. For example the delineation input characteristics may comprise one or more of: aspect ratio, percent of pixels above horizontal half point, percent of pixels to right of vertical half point, number of strokes, orientation of strokes, stroke order, spacing between strokes, number of contiguously scribed inputs, average distance from image centre, one or more reflection axis, position of stroke intersections and stroke curvature. Each delineation input characteristics may have an error value to take into account variations in user-scribed delineation input intended to correspond to the same delineation character. A stroke of the user-scribe delineation input may be generated by a single continuous action, and/or number of discrete non-continuous actions within a particular predetermined time.

The apparatus may comprise:
a user-scribe delineation user interface, wherein the user-scribe delineation user interface is configured to detect at least one of motion and position of a scriber to generate user-scribed delineations.

The key user interface and/or the user-scribe delineation interface may comprise a wand, a touchpad, a keyboard, a virtual keyboard, a touch-screen, a stylus and pad, a mouse, a motion detector, a position detector, a scriber or an accelerometer.

The key user interface may comprise an alphanumeric key input area, a numeric key input area, an AZERTY key input area, a QWERTY key input area or an ITU-T E.161 key input area.

The textual message maybe a combination of one or more of an SMS message, a MMS message, an email, a document, an address bar entry, a search entry, a URL and a telephone number.

The apparatus may be at least one of a portable electronic device, circuitry for a portable electronic device, a module for a portable electronic device, a laptop computer, a desktop computer, a mobile phone, a Smartphone, a monitor, a personal digital assistant or a digital camera.

The apparatus may be connected to a network. The network may be, for example, the internet, a mobile phone network, a wireless network, LAN or Ethernet. The apparatus may comprise a transmitter and or receiver to interact with a network. The transmitter/receiver may comprise, for example, an antenna, an Ethernet port, a LAN connection, a USB port, a radio antenna, Bluetooth connector, infrared port, fibre optic detector/transmitter.

Memory may comprise, for example, a CD, a DVD, flash memory, a floppy disk, a hard disk, volatile memory, non-volatile memory and/or Random Access Memory.

In a second aspect, there is provided a method, the method comprising:
detecting, from a key user interface of an electronic device, key input of a particular key character from a first set of key characters;
detecting, from a user-scribe delineation user interface of the electronic device, user-scribed delineation input of a particular delineation character from a second set of delineation characters, wherein the first and sets of characters comprise respective mutually exclusive sets of characters; and
associating together the particular key character and the particular delineation character for display In a third aspect, there is provided a computer program, the computer program comprising computer code configured to:
detect, from a key user interface of an electronic device, key input of a particular key character from a first set of key characters;
detect, from a user-scribe delineation user interface of the electronic device, user-scribed delineation input of a particular delineation character from a second set of delineation characters;

wherein the first and sets of characters comprise respective mutually exclusive sets of characters, and wherein the apparatus is configured to associate together the particular key character and the particular delineation character for display The apparatus or processor may be incorporated into an electronic device. The apparatus may be the (portable) electronic device. The electronic devices/apparatus (which may or may not be portable) may provide one or more of audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a in-built digital camera), and gaming functions. The electronic device which may or may not be portable may comprise, for example, a computer (including a laptop), a phone, a monitor, a mobile phone, and/or a personal digital assistant.

The computer program may be stored on a storage media (e.g. on a CD, a DVD, a memory stick or other non-transitory media). The computer program may be configured to run on the device as an application. An application may be run by the device via an operating system.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods/apparatus disclosed are also within the present disclosure and encompassed by one or more of the described embodiments.

As processing such a message as described herein may preclude the need to render/store a message in standard font, it may be more difficult for a third party to electronically query the message (e.g. to search for key words or for private details such as addresses, phone numbers, account details). This may make data transfer/storage more secure.

The apparatus, processor and/or memory may be configured to initiate a messaging, notes or contacts application upon receiving/detecting user-scribe input.

The above summary is intended to be merely exemplary and non-limiting.

Also disclosed is an apparatus comprising:
means for detecting, from a key user interface of an electronic device, key input of a particular key character from a first set of key characters;
means for detecting, from a user-scribe delineation user interface of the electronic device, user-scribed delineation input of a particular delineation character from a second set of delineation characters, wherein the first and sets of characters comprise respective mutually exclusive sets of characters; and
means for associating together the particular key character and the particular delineation character for display.

BRIEF DESCRIPTION OF THE FIGURES

A description is now given, by way of example only, with reference to the accompanying drawings, in which.

DESCRIPTION OF EXAMPLE ASPECTS/EMBODIMENTS

For the sake of convenience, different embodiments depicted in the figures have been provided with reference numerals that correspond to similar features of earlier described embodiments. For example, feature number 1 can also correspond to numbers 101, 201, 301 etc. These numbered features may not have been directly referred to within the description of these particular embodiments. These have still been provided in the figures to aid understanding of the further embodiments, particularly in relation to the features of similar described embodiments.

It is common for a user to use an electronic device to enter characters using a user interface, for example, to write a text message, enter a search term, or write a letter. In order to enter characters, conventional user interfaces have utilised keys which correspond to characters. When the user presses a key the corresponding character is entered. Nevertheless, the keyboard presented may limit the number of characters available. For example, a conventional QWERTY keyboard may not facilitate the direct entry of currency symbols such as '¥' or '€' or other non-alphabetic characters. To enter characters not directly available from the keys of the keyboard, previous solutions have relied on repeatedly pressing the same key (e.g. multi-tap text messaging), pressing multiple keys (e.g. 'Alt' key codes), or changing the mode of the device to show alternative keyboards. These solutions rely on the user having knowledge of how to access the characters not provided directly by the displayed keyboard. For example, the amount of special characters may be large and require several additional keyboard views through which the user must search to find the required character. This issue may be more acute in devices with restricted user interfaces, for example, in portable electronic devices such as mobile phones and/or PDAs, or for interfaces enabling non-Latin-alphabet language entry (e.g. Chinese, Korean) as these languages may have more character symbols.

An alternative solution has been to use handwriting recognition. However, a robust system for recognising characters has proved problematic, particularly when using a finger to enter the text (finger input being a common way of interacting with a touch-screen device). Hand writing recognition generally places strict requirements on the user's accuracy/formatting, and typically need a mode switch to distinguish between delineations of similar characters e.g. between the number '5' and the letter 'S'. Furthermore, many users prefer keyboard-based touch-screen input rather than handwriting-recognition based input.

Example embodiments contained herein may be considered to provide a way of enabling input of characters not provided by the keys of a user interface using delineation input recognition, for example, using handwriting recognition or gesture recognition.

Figure 1:
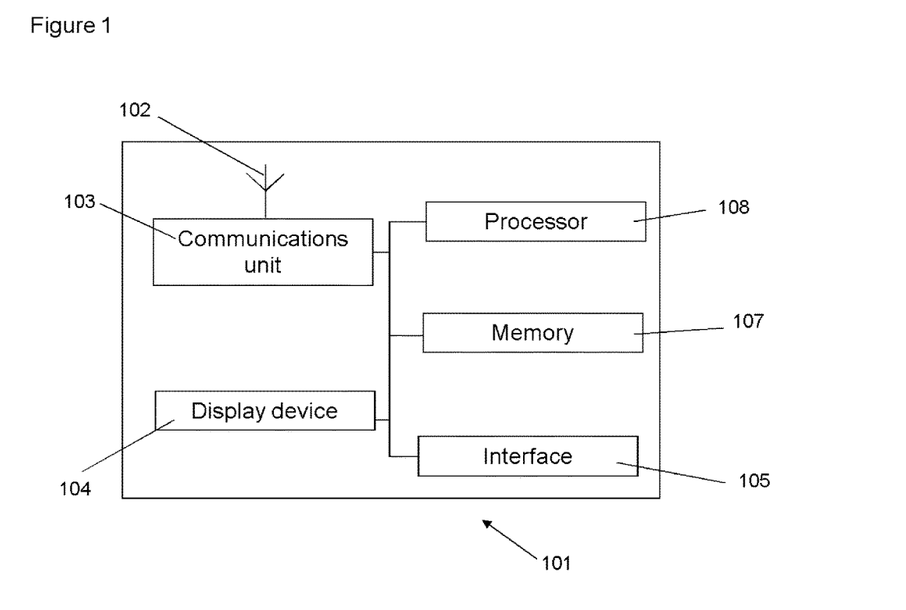
FIG. 1 depicts an embodiment comprising a number of electronic components, including memory, a processor and a communication unit.

FIG. 1 depicts an embodiment (101) of an apparatus, such as a mobile phone, comprising a display device (104) such is for example, a Liquid Crystal Display (LCD). In other embodiments, the apparatus (101) may comprise a module for a mobile phone (or PDA or audio/video player), and may just comprise a suitably configured memory (107) and processor (108).

The apparatus (101) of FIG. 1 is configured such that it may receive, include, and/or otherwise access data. For example, this embodiment (101) comprises a communications unit (103), such as a receiver, transmitter, and/or transceiver, in communication with an antenna (102) for connecting to a wireless network and/or a port (not shown) for accepting a physical connection to a network, such that data may be received via one or more types of networks. This embodiment comprises a memory (107) that stores data, possibly after being received via antenna (102) or port or after being generated at the user interface (105). The user interface may allow a user to scribe one or more individual user-scribed delineations. The processor (108) may receive individual user-scribed delineations from the user interface (105), from the memory (107), or from the communication unit (103). Regardless of the origin of the data, these data may be outputted to a user of apparatus (101) via the display device (104), and/or any other output devices provided with apparatus. The processor (108) may also store the data for later user in the memory (107). The memory (107) may store computer program code and/or applications which may be used to instruct/enable the processor (108) to perform functions (e.g. generate/delete or process data).

Figure 2:
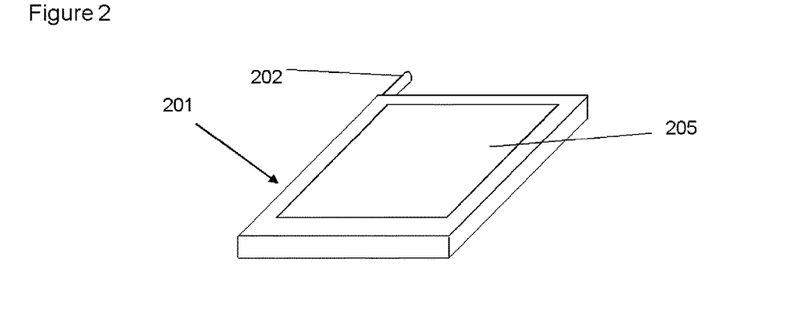
FIG. 2 illustrates an embodiment comprising a touch-screen.

FIG. 2 depicts an embodiment of the apparatus comprising a portable electronic device (201), e.g. such as a mobile phone, with a user interface comprising a touch-screen user interface (205), a memory (not shown), a processor (not shown) and an antenna (202) for transmitting data (e.g. a message comprising entered characters). The portable electronic device is configured to allow the user to scribe a delineation by tracing the desired shape with his/her finger on the screen (when the device is configured to be in a scribing mode). It will be appreciated that in other suitably adapted embodiments the delineations may be scribed using a mouse, a stylus, a touch pad or a keyboard.

Figure 3A:
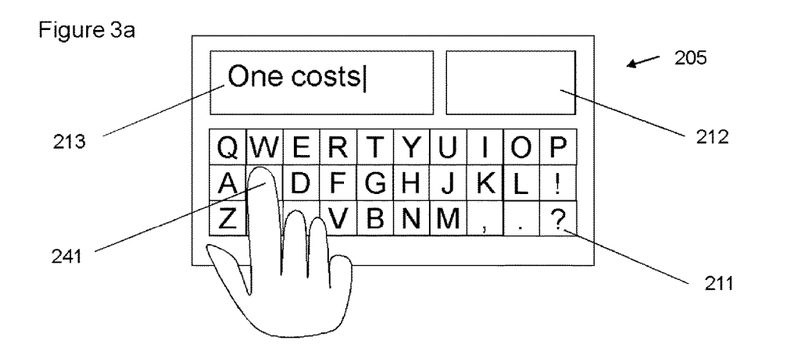
FIG. 3a-c illustrates the views of the touch-screen as a user inputs a message.
Figure 3B:
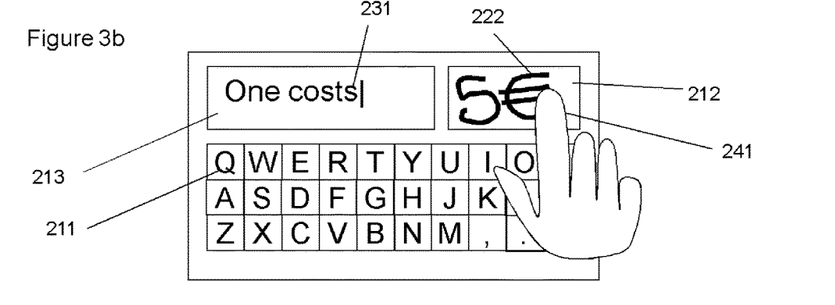
Figure 3C:
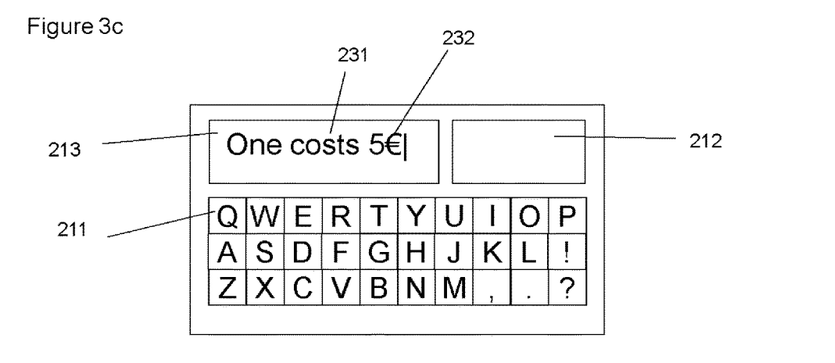

FIG. 3a-c illustrates a series of views of the touch-screen user interface when the device is in use. In this example, the user wants to write a message comprising the word 'one costs €5' and send it, via a network (e.g. mobile phone network, internet, LAN or Ethernet), to a friend. To facilitate scribing such a message, this embodiment has an input mode wherein the touch-screen user interface (205) is divided into three regions: a key user interface (211) which in this case is a virtual keyboard having, for example, letter keys a-z arranged according to the QWERTY layout; a user-scribe delineation user interface (212) which is responsive to touch; and an entered character region (213). The user-scribe delineation user interface (212) of the screen is where the user can scribe a delineation by moving his finger (i.e. the user's finger is the scriber in this example) across the screen. The entered character region (213) of the touch-screen user interface (205) is configured to display an arrangement of the characters already entered into the device (e.g. via the user-scribe delineation user interface (212) and key user interface (211)). The key user interface (211) region displays a number of touch buttons or keys which the user can activate by pressing in order to enter a corresponding character.

FIG. 3a depicts the touch-screen of the user interface as the user is entering characters, in this case, into a textual message. This embodiment is configured to detect, from the key user interface region (211) of the touch-screen user interface (205) of an electronic device, key input of a particular key character from a first set of key characters. In this case the first set of key characters comprise the letters 'a'-'z', and the punctuation marks '?', '.', ',' and '!'. For example, when the user activates the key 'a' of the key user interface region (211), the apparatus is configured to generate corresponding key input corresponding to the letter 'a', and input the letter 'a' into the entered character field (213). FIG. 3a depicts the situation where the user has activated the series of keys corresponding to the characters making up the words 'one costs'. These characters are then displayed in the entered character region (213) of the touch-screen user interface (205).

This embodiment is configured to detect, from a user-scribe delineation user interface (212) of the electronic device, user-scribed delineation input of a particular delineation character from a second set of delineation characters. The second set of delineation characters in this case comprises the numerical characters '0' to '9', and a selection of currency characters including the Euro symbol '€'. The first and second sets of characters comprise respective mutually exclusive sets of characters in the sense that the virtual keyboard would not immediately allow entry of numbers '0' to '9' without changing to a numerical mode, for example. Depicted in FIG. 3b, is touch-screen user interface (211) as the user is scribing a delineation corresponding to the characters '5' and '€'. The apparatus in this case is configured to determine the delineation characters corresponding to the delineation input using handwriting recognition (by correlating the input with the second set of characters). It will be appreciated that for other embodiments, one user-scribed delineation will correspond to a single character.

In this case the apparatus is configured to recognise that there are two user scribed delineation input scribed in the user-scribe delineation user interface (212). In this case, the apparatus recognises each contiguously scribed input as user-scribed delineation input corresponding to one delineation character. That is, all of the strokes of the user scribed '5' are joined, or overlap, as is the case for the user scribed '€' symbol.

In this case, in order to recognise the user scribed delineation input as a delineation character, each delineation character has a corresponding set of delineation input characteristics. In this example, the set of delineation input characteristics define that the user-scribe delineation input corresponding to the '5' delineation character has three strokes, wherein one of the strokes is an open curve with the opening on the right, and wherein two of the strokes are substantially parallel and substantially horizontal and intersect the open curve at substantially the middle. It will be appreciated that other embodiments may use different sets of characteristics to recognise the same delineation character.

When the delineation characters corresponding to the scribed delineation have been determined (following character recognition) they are entered into the entered character region of the user interface. In this way, the apparatus is configured to associate together the particular key character and the particular delineation character for display.

It will be appreciated that for other embodiments, the user-scribe delineation user interface (211) may be displayed in along with the user-scribe delineation user interface (212), or the apparatus may be configured to enable the user to switch between the two, by key or stroke action on the user interface. It will be appreciated that the scribing region may overlap with the keyboard. For example, gestures which contact more than one key may be recognised as user-scribed delineation input, and gestures which activate only one key may be recognised as key input.

It will be appreciated that other embodiments may comprise physical buttons/keys in place of or in addition to touch buttons/keys provided on a touch-screen.

Figure 4A:
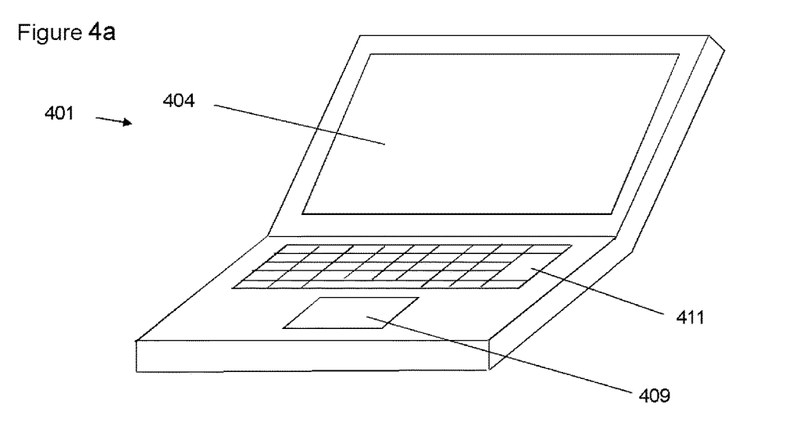
FIG. 4a illustrates a further embodiment comprising a screen, a physical keyboard and a touch pad.

FIG. 4a illustrates a further embodiment (401) of an apparatus such as a personal digital assistant device comprising a user interface, the user interface comprising a touchpad (409), a key user interface (411) which, in this case, is a physical keyboard. This embodiment further comprises a screen (404); a processor and memory (not shown). Unlike the apparatus of FIG. 2 in which the user interface and the display functions were both provided by a touch-screen, in this embodiment these functions are provided by a screen (404), a physical keyboard (405) and a touchpad (409). In this example, the user wishes to type the message "I got it ☺".

In this case, the key input comprises single-press key input corresponding to a single press of a single key, and multiple-key key input corresponding to single presses of multiple keys.

In this case the keys of the key user interface (411) of the embodiment correspond to the lowercase letter characters 'a' to 'z', accented letter characters (e.g. 'á', 'ö'), and a space character, the key characters making up the first set of key characters. The key characters corresponding to single-press key input comprise lower-case letters of the Latin alphabet, 'a' to 'z' and the space character. Accented letters (e.g. 'á') correspond to multiple-key key input (e.g. the 'á' key character corresponds to pressing a function key, such as a 'Alt-Gr' key and the 'a' key).

In this embodiment, as the accented letter characters are denoted as key characters, they cannot be obtained by providing delineation input. It will be appreciate that for other embodiments, the key input may comprise only single-press key input corresponding to single presses of a single key. In such embodiments, those characters corresponding to single presses of multiple keys (either consecutively and/or simultaneously) and/or multiple presses of single keys may be denoted as delineation characters.

The screen (404) displays a user-scribe delineation user interface region (412), with which the user can interact using the touchpad (409) via a cursor (451) to generate user-scribed delineation input.

Figure 4B:
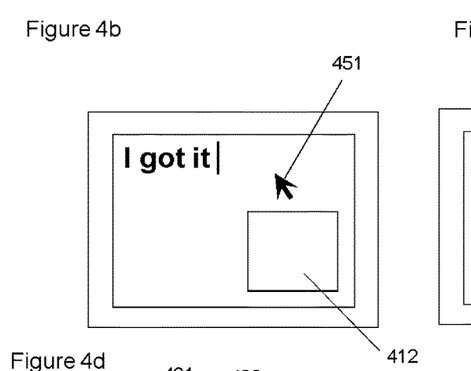
FIG. 4b-d illustrates the views of the screen as a user inputs a message.

The screen (404) of the embodiment of FIG. 4a is shown in FIG. 4b as the user is composing the message. The user has activated the keys of the key user interface physical keyboard (411) to enter the characters corresponding to the sentence 'I got it'.

The second set of delineation characters for this embodiment comprises emoticon delineation characters, such as '☺', '☹' and '☻'. The first list of key characters and the second list of delineation characters are mutually exclusive.

Figure 4C:
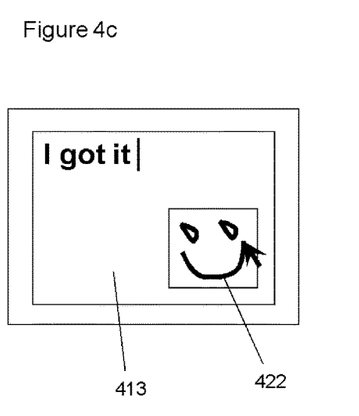

In order to generate user-scribed delineation input of the smiley emoticon delineation character, '☺', the user moves the cursor to the user-scribe delineation user interface region (412) provided on the screen (404). By pressing and dragging his finger across the touchpad when the cursor is in the user-scribe delineation user interface region (412), the user generates user-scribed delineation input. The user-scribed delineation (422) scribed by the user is depicted in FIG. 4c. In this case, the apparatus recognises the user-scribed delineation input as corresponding to the '☺' delineation character by virtue of the shape of the scribed strokes.

In this case, in order to recognise the user scribed delineation input as a delineation character, each delineation character has a corresponding set of delineation input characteristics. In this example, the set of delineation input characteristics defines that the delineation input corresponding to the delineation character '☺' comprises three separate, or non-contiguous, strokes, wherein the lowermost stroke curves upwards, and the two uppermost strokes lie in a substantially horizontal line, and wherein the user scribed delineation is substantially symmetrical about a substantially vertical line. It will be appreciated that in this case, the definitions of lowermost and vertical are with respect to the user-scribe delineation user interface region (412). It will be appreciated that other embodiments may use different sets of characteristics to recognise the same delineation character.

Figure 4D:
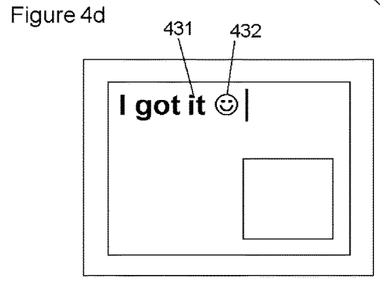

When the delineation character has been recognised the apparatus is configured to enter the character into the entered character region of the display (413), thereby associating together the entered key characters (431) and the entered delineation characters (432) for display. This is depicted in FIG. 4d.

Figures 5A, 5B:
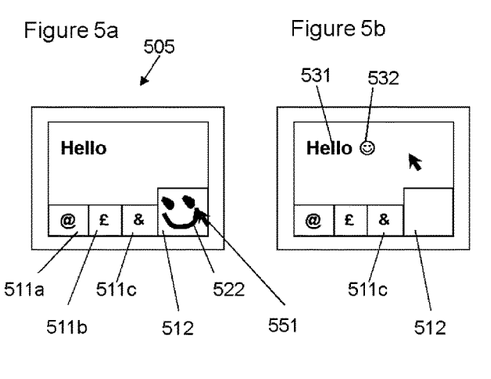
FIG. 5a-c illustrates the views of a screen of a further embodiment as a user inputs a message.

FIG. 5a illustrates the screen of a further embodiment of an apparatus such as a personal digital assistant device. Like the embodiment of FIG. 4, this embodiment comprises a screen (505), a physical keyboard key user interface (not shown), a touchpad (not shown), a processor and memory (not shown). However, in addition to the physical keyboard key user interface, there is provided a virtual keyboard key user interface on the screen (505). The virtual keys of the virtual keyboard key user interface augment the physical keyboard and each of the virtual keys of the virtual keyboard key user interface and the physical keys of the physical keyboard key user interface are associated with key characters.

In this case the sets of delineation characters and key characters can be changed, wherein characters can be denoted as being either key characters or delineation characters depending on the frequency of use, thereby moving the denoted characters between the first and second sets of characters. FIG. 5a depicts the situation when the user is entering characters. In the situation depicted in FIG. 5a, the key characters comprise a set of virtual key characters displayed on the virtual keys (511a-511c) on the screen, and physical key characters corresponding to physical keys of the physical keyboard key user interface. In the situation depicted in FIG. 5a, the virtual key characters comprise the characters '@', '£' and '&'. The delineation characters comprise the emoticons '☺', '☹' and '☻'.

Figure 5C:
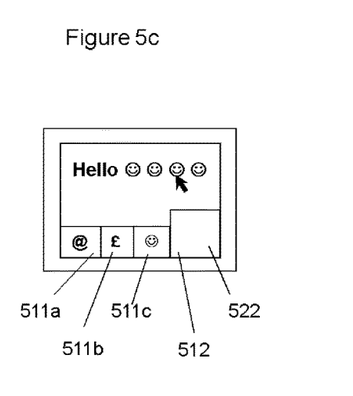

In the situation depicted in FIG. 5a, the user has entered the word 'Hello' using the physical keys of the physical keyboard key user interface. In order to enter a smiley emoticon delineation character, which does not have a corresponding physical or virtual key, the user scribes a delineation corresponding to the smiley emoticon character, '☺', in the scribing region using the touch pad. After entering one smiley emoticon character, '☺', the user scribes several more, as depicted in FIG. 5b. This embodiment is configured to record the frequency of use of the delineation characters and of the virtual key characters. In this example, when the user has entered several smiley emoticon characters, '☺', by providing delineation input, the apparatus determines that the frequency of use of the smiley emoticon character '☺' exceeds the frequency of use of the virtual key character '&'. In response to this determination, the character associated with the virtual key (511c) is associated with the smiley emoticon character '☺'. That is, the smiley emoticon character has been denoted as being a key character from being a delineation character. Correspondingly, the ampersand character '&' is denoted as being a delineation character from being a key character. This is depicted in FIG. 5c as the image of the key (511c) has changed from being a '&' to being a '☺'. Therefore, when the user wishes to enter the newly denoted key character '☺', the user activates the virtual key 211c corresponding to the '☺' character. Correspondingly, the ampersand character '&' could previously be entered using the virtual keyboard, whereas in the situation depicted in FIG. 5c, the ampersand character '&' has been associated with delineation input. In the situation depicted in FIG. 5c, the user would scribe an '&' in the scriber region in order to enter the corresponding delineation character '&'.

In a general sense this may be considered to be denoting an input character as being either a key input character or a delineation input character. In this case the denotation is based frequency of use. It will be appreciated that the frequency may be determined for a certain period. For example, the average frequency may be determined for a certain number of messages (e.g. last 50 messages), and/or characters (e.g. last 1000 characters). Alternatively/in addition, the denotation may be based on the type of character (for example, letters may be denoted as key characters, and emoticons and punctuation marks as delineation characters or vice versa), a default selection and/or user selection.

Advantages of the disclosed apparatus/method may include that the most commonly used characters can be directly selected using the keys. It also may allow the scriber delineation to be more robust as those characters associated with the keys will not be searched. For example, when the user scribes '5' it will not be mistakenly identified with the letter 'S', as 'S' is associated with a key and not with a scribed delineation. It may also give immediate access to a wide variety of infrequently used characters on, for example, a small or otherwise limited user interface.

Advantages over a full handwriting recognition solution may include that it is more practical to use with fingers rather than a stylus as the user is required, for example, to input only occasional strokes and characters with delineation recognition. It may also be more tolerant of individual users stroke analysis and may not require any additional mode switching (e.g. between number and letter modes for delineation recognition). As the amount of characters is limited the delineation recognition may be more accurate.

Advantages over a keyboard only solution may include that the user interface is more intuitive and allows faster and more natural input of special characters. For example, the user may not have to search through several pages of keyboard characters (or different keyboard modes) to find the required character. In addition, complex characters comprising several constituent elements (e.g. emoticons) may be input as a single character. It may also enable faster and more natural input in languages that require the use of character modifier strokes (e.g. diacritical marks).

Figure 6:
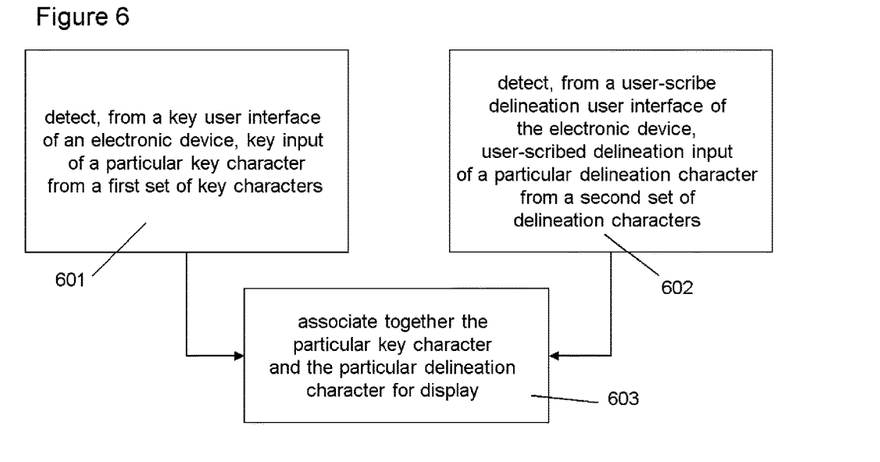
FIG. 6 depicts a flow diagram describing the method used to store/transmit a composite image.

FIG. 6 shows a flow diagram illustrating the association of a key character and a delineation character for display.

Figure 7:
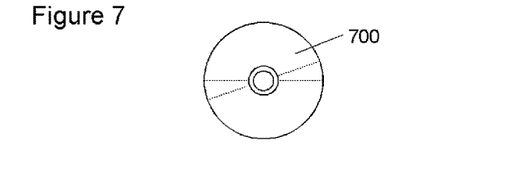
FIG. 7 illustrates schematically a computer readable media providing a program according to an embodiment of the present invention.

FIG. 7 illustrates schematically a computer/processor readable media 700 providing a program comprising computer code which implements one or more of the aforementioned embodiments. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
a processor; and
a memory including computer program code,
the memory and the computer program code configured to, with the processor, cause the apparatus to perform the following:
detect, from a key user interface of an electronic device, key input of a particular key character from a first set of key characters;
detect, from a user-scribe delineation user interface of the electronic device, user-scribed delineation input of a particular delineation character from a second set of delineation characters;
wherein the first and second sets of characters are respective mutually exclusive sets of characters, such that the characters of the first and second sets of characters are ineligible as belonging to both the first set of key characters and the second set of delineation characters in a single instance of time;
associate together the particular key character and the particular delineation character for display; and
change at least one frequently used character of the set of delineation characters to belong to the first set of key characters based on a frequency of use of the at least one frequently used delineation character, such that the at least one frequently used character is no longer recognized by the apparatus as belonging to the second set of delineation characters in an instance the at least one frequently used character is provided via the user-scribe delineation user interface.

2. The apparatus of claim 1 wherein the first set of key characters and the second set of delineation characters are mutually exclusive such that the second set delineation characters are characters which are not immediately available for entry via the key user interface.

3. The apparatus of claim 1 wherein user interface comprises a display, the display configured to:

display a key user interface region representing a virtual keyboard; and
a separate user-scribe delineation user interface region configured to produce delineation input in response to user interaction.

4. The apparatus of claim 1 wherein apparatus is configured to:
denote an input character as being either a key input character or a delineation input character, based on at least one of type of character, user selection and frequency of use.

5. The apparatus of claim 1 wherein the association of a delineation input character with a said received delineation input is configured to be performed using at least one of gesture recognition and handwriting recognition.

6. The apparatus of claim 1 wherein the apparatus comprises:
a user interface, wherein the user interface is configured to detect at least one of motion and position of a scriber to generate user-scribed delineations.

7. The apparatus of claim 1 wherein the user interface comprises a wand, a touchpad, a touch-screen, a mouse, a motion detector, a position detector, a scriber or an accelerometer.

8. The apparatus of claim 1 wherein the textual message is a combination of one or more of an SMS message, a MMS message, an email, a document, an address bar entry, a search entry, a URL and a telephone number.

9. The apparatus of claim 1 wherein a said character comprises a combination of one or more of a word, a letter character, a graphic character, a drawing, a phrase, a syllable, a diacritical mark, an embellishment mark, an emoticon, a punctuation mark and a sentence.

10. The apparatus of claim 1, wherein the key input comprises a combination of one or more of:
single-press key input corresponding to a single press of a single key;
multiple-press key input corresponding to multiple presses of a single key; and
multiple-key key input corresponding to single presses of multiple keys.

11. The apparatus of claim 10, wherein the key user interface comprises an alphanumeric key input area, a numeric key input area, an AZERTY key input area, a QWERTY key input area or an ITU-T E.161 key input area.

12. The apparatus of claim 1, wherein
the first set of key characters comprises alphabetic characters; and
the second set of delineation characters comprises numeric characters.

13. The apparatus of claim 1, wherein
the first set of key characters comprises alphanumeric characters; and
the second set of delineation characters comprises emoticons.

14. The apparatus of claim 1, wherein
the first set of key characters comprises alphanumeric characters; and
the second set of delineation characters comprises punctuation marks.

15. The apparatus of claim 1, wherein
the first set of key characters comprises logograph characters; and
the second set of delineation characters comprises alphanumeric marks.

16. The apparatus according to claim 1, wherein the apparatus is at least one of a portable electronic device, circuitry for a portable electronic device, a module for a portable electronic device, a laptop computer, a desktop computer, a mobile phone, a Smartphone, a monitor, a personal digital assistant or a digital camera.

17. The apparatus of claim 1, wherein changing the at least one of the set of delineation characters to belong to the first set of key characters results comprises:
   removing the particular character from the set of delineation characters such that the particular character is no longer recognized by the user-scribe delineation user interface; and
   providing the particular character as a key characters by the key character interface in subsequent use.

18. The apparatus of claim 1, wherein the memory and the computer program code are further configured to, with the processor, cause the apparatus to perform the following:
   changing at least one infrequently used character of the set of key characters to belong to the set of delineation characters based on a frequency of use of the at least one infrequently used character.

19. A method comprising:
   detecting, from a key user interface of an electronic device, key input of a particular key character from a first set of key characters;
   detecting, from a user-scribe delineation user interface of the electronic device, user-scribed delineation input of a particular delineation character from a second set of delineation characters, wherein the first and second sets of characters are respective mutually exclusive sets of characters, such that the characters of the first and second sets of characters are ineligible as belonging to both the first set of key characters and the second set of delineation characters in a single instance of time;
   associating together the particular key character and the particular delineation character for display; and
   changing at least one frequently used character of the set of delineation characters to belong to the first set of key characters based on a frequency of use of the at least one frequently used delineation character, such that the at least one frequently used character is no longer recognized by the electronic device as belonging to the second set of delineation characters in an instance the at least one frequently used character is provided via the user-scribe delineation user interface.

20. A computer program embodied on a non-transitory computer readable medium, the computer program comprising computer code configured to:
   detect, from a key user interface of an electronic device, key input of a particular key character from a first set of key characters;
   detect, from a user-scribe delineation user interface of the electronic device, user-scribed delineation input of a particular delineation character from a second set of delineation characters;
   wherein the first and second sets of characters are respective mutually exclusive sets of characters, such that the characters of the first and second sets of characters are ineligible as belonging to both the first set of key characters and the second set of delineation characters in a single instance of time;
   associate together the particular key character and the particular delineation character for display; and
   change at least one frequently used character of the set of delineation characters to belong to the first set of key characters based on a frequency of use of the at least one frequently used delineation character, such that the at least one frequently used character is no longer recognized by the electronic device as belonging to the second set of delineation characters in an instance the at least one frequently used character is provided via the user-scribe delineation user interface.

* * * * *